United States Patent
Hausmann et al.

(10) Patent No.: US 9,070,912 B2
(45) Date of Patent: Jun. 30, 2015

(54) FUEL CELL SYSTEM HAVING AN INTEGRAL TURBINE/COMPRESSOR UNIT

(75) Inventors: Philipp Hausmann, Kirchheim (DE); Andreas Knoop, Esslingen (DE)

(73) Assignee: Daimler AG, Stuttgart (DE)

( * ) Notice: Subject to any disclaimer, the term of this patent is extended or adjusted under 35 U.S.C. 154(b) by 142 days.

(21) Appl. No.: 13/819,230

(22) PCT Filed: Aug. 16, 2011

(86) PCT No.: PCT/EP2011/004097
§ 371 (c)(1),
(2), (4) Date: Feb. 26, 2013

(87) PCT Pub. No.: WO2012/031663
PCT Pub. Date: Mar. 15, 2012

(65) Prior Publication Data
US 2013/0157154 A1     Jun. 20, 2013

(30) Foreign Application Priority Data
Aug. 30, 2010   (DE) .................. 10 2010 035 860

(51) Int. Cl.
*H01M 8/04* (2006.01)
*F01D 1/02* (2006.01)
*H01M 8/10* (2006.01)

(52) U.S. Cl.
CPC ........... *H01M 8/04097* (2013.01); *F01D 1/026* (2013.01); *H01M 8/04014* (2013.01); *H01M 8/04111* (2013.01); *H01M 8/04164* (2013.01); *H01M 8/04201* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| | | |
|---|---|---|
| 7,465,510 B1 | 12/2008 | Johnson et al. |
| 8,339,122 B2 | 12/2012 | Cox et al. |
| 2003/0077499 A1 | 4/2003 | Siepierski et al. |
| 2005/0147862 A1* | 7/2005 | Knoop et al. .................. 429/34 |
| 2007/0190389 A1* | 8/2007 | Hinsenkamp et al. .......... 429/34 |
| 2007/0292282 A1* | 12/2007 | Schuetzle et al. ............. 417/273 |

(Continued)

FOREIGN PATENT DOCUMENTS

| | | |
|---|---|---|
| DE | 102 49 384 A1 | 5/2003 |
| DE | 20 2005 017 574 U1 | 2/2006 |
| DE | 10 2006 003 799 A1 | 7/2007 |

(Continued)

OTHER PUBLICATIONS

Japanese-language Notification of Reason for Refusal dated Jan. 28, 2014, with English translation (7 pages).

(Continued)

*Primary Examiner* — Patrick Ryan
*Assistant Examiner* — Wyatt McConnell
(74) *Attorney, Agent, or Firm* — Crowell & Moring LLP

(57) ABSTRACT

A fuel cell system includes at least one fuel cell having an anode chamber, a cathode chamber, a hydrogen pressure reservoir, a recirculation line connecting an outlet of the anode chamber to an inlet of the anode chamber, a recirculation conveyor with a compressor wheel in the region of the recirculation line, and a turbine for expanding the hydrogen that is under pressure before entry into the anode chamber. The recirculation conveyor is driven at least partially by the turbine. The turbine and the compressor wheel are formed in one component.

20 Claims, 2 Drawing Sheets

(56) References Cited

U.S. PATENT DOCUMENTS

| | | |
|---|---|---|
| 2009/0142644 A1 | 6/2009 | Osborne et al. |
| 2011/0189555 A1 | 8/2011 | Baur et al. |

FOREIGN PATENT DOCUMENTS

| | | |
|---|---|---|
| DE | 10 2008 045 170 A1 | 3/2010 |
| DE | 10 2006 003 799 B4 | 5/2010 |
| JP | 1-274632 A | 11/1989 |
| JP | 2004-345426 A | 12/2004 |
| JP | 2005-228635 A | 8/2005 |
| JP | 2006-286559 A | 10/2006 |
| JP | 2010-527020 A | 8/2010 |
| JP | 2012-501055 A | 1/2012 |
| WO | WO 2008/052578 A1 | 5/2008 |
| WO | WO 2010/022950 A1 | 3/2010 |

OTHER PUBLICATIONS

International Search Report with English translation dated Jan. 11, 2012 (six (6) pages).

German-language Written Opinion (PCT/ISA/237) (six (6) pages).

* cited by examiner

FUEL CELL SYSTEM HAVING AN INTEGRAL TURBINE/COMPRESSOR UNIT

BACKGROUND AND SUMMARY OF THE INVENTION

Exemplary embodiments of the present invention relate to a fuel cell system.

German patent document DE 10 2006 003 799 B4 describes a fuel cell system in which pressure is relieved from a hydrogen pressure reservoir in a turbine. This turbine then, at least partially, drives a recirculation conveying means in the region of a recirculation line around an anode chamber of at least one fuel cell of the fuel cell system. The construction, which may also have for assistance an electric motor drive for recirculation conveying means, in such case utilizes the pressure energy in the hydrogen pressure reservoir upon the expansion of the hydrogen that is necessary anyway, in order to utilize said energy for driving the recirculation conveying means.

The construction in this German patent document is comparatively complex, and is costly with regard to the sealing and the mixing of the recirculated gas flow and the fresh hydrogen. The complex structural form furthermore requires a comparatively large amount of installation space, and is correspondingly heavy. This German patent document further proposes to accelerate the hydrogen to speeds above the speed of sound of the hydrogen, i.e. to speeds above Mach 1, with the aid of a Laval nozzle. Using a Laval nozzle in such case, however, is disadvantageous because the desired effect can be achieved merely at a single load point or in the region of a single load point of the fuel cell system. For only there does the correct pressure ratio, which is dependent on the length of the Laval nozzle, occur. At all the other load points or operating points, what is called a vertical compression shock will occur. After the Laval nozzle, speeds that are lower than the speed of sound then occur.

German patent document DE 10 2008 045 170 A1 describes the utilization of the heat sink produced upon the expansion of hydrogen from a hydrogen pressure reservoir in order to cool heat generating component parts in the fuel cell system.

German Utility Model DE 20 2005 017 574 U1 discloses a split cage motor for driving a recirculation conveying means for recirculating anode exhaust gas around the anode chamber of a fuel cell. The advantage of such a split cage motor is that the hydrogen carrying region together with the rotor can be sealed off hermetically with respect to the stator of the split cage motor, so that there are no complications with regard to the sealing off of hydrogen carrying regions.

Exemplary embodiments of the present invention are directed to a very compact and energy efficient fuel cell system that avoids the disadvantages mentioned above.

According to exemplary embodiments of the present invention, a compressor wheel and turbine are combined in a single component so that a simple and efficient fuel cell can be provided that has a very compact construction. Thus, in addition to the high energy efficiency due to the utilization of the pressure of the hydrogen after the pressure regulator of the compressed gas reservoir, a very compact construction of the device is also achieved. This can be made correspondingly simple, lightweight and with a low structural volume. In addition to the structural volume, this also saves on weight and costs.

In one particularly beneficial development of the fuel cell system according to the invention, the hydrogen flows onto the turbine via a nozzle having a nozzle needle, the throughflow of hydrogen being adjustable by a relative movement of the nozzle with respect to the nozzle needle. The throughflow of hydrogen through the nozzle and the displaceable nozzle needle—or conversely—is adjustable, and can thus be adapted to the respective load demand or the respective operating point of the fuel cell system. In order to achieve the highest possible speed at the nozzle exit, the annular area produced by the needle and nozzle should be the narrowest point of the hydrogen metering device. If at the same time a critical pressure ratio is present, then, driven by this pressure ratio, the speed of sound of the hydrogen is achieved at the narrowest point of the needle valve. The hydrogen then enters the turbine in ideal manner at Mach 1.

In a further very advantageous configuration of the fuel cell system according to the invention, the turbine is a Pelton turbine. Such a Pelton turbine utilizes the energy applied by a gas jet, which can be generated, for example, in accordance with the configuration set forth above via a nozzle, comparatively efficiently, so that a particularly high energy yield can be achieved with the Pelton turbine. Thus, the energy requirement that has to be applied by other drive means can be minimized, so that overall the efficiency of the fuel cell system can be increased.

In a further very beneficial and advantageous variant of the fuel cell system according to the invention, the component has channels connecting the region of the turbine and the region of the compressor wheel together. In addition to the pure momentum exchange between the hydrogen gas under high pressure that is expanding and the turbine, overflowing of gas out of the region of the turbine thus also takes place once it has imparted a momentum to the turbine, in the region of the compressor wheel. Thus, the volumetric flow of the recirculated exhaust that is conveyed via the compressor wheel is ideally mixed with the volumetric flow of the fresh hydrogen penetrating via the channels out of the region of the turbine into the region of the compressor wheel, so that a very well mixed and very homogeneous gas flow of fresh hydrogen and recirculated anode exhaust gas is present after the recirculation conveying means. This means that the route between the recirculation conveying means and the anode chamber of the fuel cell can be shortened, since it no longer has to be used in order to ensure the uniform distribution of the gas. Accordingly, installation space and material for lines can be saved with the fuel cell system. In addition to the saving on installation space, a saving in terms of weight and costs also occurs.

In a beneficial configuration of the invention, the channels are formed, starting from the region of the turbine, such that the hydrogen flowing through the channels flows into the region of the compressor wheel substantially in the same direction as the flow of the exhaust gas in the compressor wheel. In the case of a configuration of the compressor wheel as a momentum exchange machine or side channel compressor, it is thus achieved that a momentum of the hydrogen flowing through the channels due to the inflow in the same direction as the conveyed exhaust can be utilized such that said hydrogen supports the vortical movement of the exhaust gas through the clever configuration of the channels. Due to the fact that the natural vortical movement of the exhaust gas is supported by the inflowing fresh hydrogen, the efficiency of the compressor wheel can be increased.

In an advantageous development of the fuel cell system according to the invention, the component can be driven by means of an electric drive motor, the drive motor being formed as a pancake motor. Typically, it may be necessary for a further drive to be present in addition to the drive of the recirculation conveying means via the turbine, in order for example to be able to continue to operate the recirculation conveying means even when the fuel cell system is idling, in order thus to ensure the uniform distribution of the gases in the recirculation circuit. Furthermore, in certain operating states the energy in the region of the turbine alone is not sufficient to drive the recirculation conveying means due to the admetered amount of fresh hydrogen being very small. Then the electric drive motor can contribute to driving the component, and hence in particular the compressor wheel. The drive motor in this case should be formed as a pancake motor. Such a pancake motor is constructed similarly to a split cage motor, and has a stator and a rotor that is formed to be able to be sealed off hermetically therefrom. Unlike with a split cage motor, however, it has a flat structural form, so that the rotor is arranged as a disk-shaped component spaced apart from the stator, which substantially likewise is formed in a disk shape. The construction thus, with the necessary sealing between rotor and stator, which in the case of a hydrogen atmosphere would be practically unable to be realized by seals with rotating union, permits a very compact structural form. The arrangement of the rotor relative to the stator in a sealed-off space is also referred to as a plate seal.

In a particularly beneficial development of this aspect, a stator of the pancake motor can be arranged above the component, the component being provided with magnetic elements and forming a rotor of the pancake motor. This can, for example, be realized by introducing additional magnets into the component, which magnets point with their magnetic fields in the direction of the stator of the pancake motor and are sealed off therefrom by a wall which is magnetically permeable. Corresponding excitation of the stator then ensures rotation of the rotor and hence rotation of the component, so that rotation of the compressor wheel also takes place.

In a beneficial development of this aspect, the rotor can be arranged in a space which is sealed off relative to the stator. This construction, as is conventional with pancake motors or split cage motors, is particularly advantageous when used with the hydrogen atmosphere, since the hydrogen atmosphere can then be sealed off comparatively simply, since there are no rotating unions through seals or similar.

In a particularly beneficial and advantageous development thereof, the space can be the interior of a water separator in the recirculation line. The construction, and thereof in particular the component with the turbine and the compressor wheel, can therefore be integrated directly in a water separator, for example by the latter forming the cover of such a water separator. The stator of the pancake motor is then arranged above the water separator, so that overall a very compact construction is produced that integrates the recirculation conveying means into a water separator which is present anyway and manages with minimal additional installation space compared with a conventional water separator.

As is also known from the prior art, the bearings of the component may be formed at least partially as gas bearings or hydrogen bearings, which are operated by hydrogen from the region of the hydrogen pressure reservoir. In addition, according to an advantageous configuration of the fuel cell system according to the invention, provision is made for at least one of the axial bearings of the component to be formed by means of a bearing tip. Such a bearing by means of a bearing tip relies on minimization of the friction by a pointed or spherical shaping of a bearing element, which then runs in a corresponding shell or ideally, in the case of a spherical formation, on a corresponding counter tip with a spherical surface. Such a construction can be realized here too, since it provides a very simple and efficient axial bearing with minimal effort and minimal costs.

In this case, the bearing tip can be formed spherically and to run on a correspondingly spherical counter surface. One of the surfaces may in this case be formed of ceramic, and the other surface of steel. With time, at most the steel tip will wear away, but this can be replaced very simply. The bearing may, for example, be braced via spring elements or the like such that the tips or spheres always contact one another with a comparable contact pressure force in regular operation. Further, the region of greatest Hertzian stress in the region of the sphere (i.e. the region in which the frictional heat is produced) can be cooled via a volumetric hydrogen flow.

An exemplary method in accordance with the present invention, the electrical components and/or magnetic components and/or bearings in the region of the recirculation conveying means can be cooled by means of hydrogen. Since the fundamental part of the recirculation conveying means with bearings and other heat generating components is typically the region around the component, here there is the possibility of achieving particularly simple and efficient cooling by cooling with hydrogen, since the hydrogen from the tank is approximately at ambient temperature and thus will be significantly cooler than the hydrogen in the anode circuit. The latter can therefore cool the components without additional cooling media having to be brought into the hydrogen carrying region, with corresponding expense with regard to sealing. A further advantage of this method is that the hydrogen is heated up thereby. This results in a reduction in the condensation of water if the hydrogen meets the recirculated exhaust of the anode chamber. This reduces, or ideally avoids entirely, the introduction of liquid into the anode chamber, so that the performance of the fuel cell is not adversely affected by channels "blocked" with liquid water in the anode chamber.

In accordance with exemplary embodiments of the present invention, the method can involve setting the throughflow through the nozzle to such that a speed of the hydrogen upon entry into the turbine is in the range from 0.8-1.05 of the speed of sound (Mach 1) of the hydrogen. Such a flow rate of the hydrogen guarantees a high momentum exchange onto the turbine, which may in particular be formed as a Pelton turbine, and also makes it possible to effect controlled imparting of the momentum onto the turbine, since ultrasonic flow effects (compression shocks) typically do not occur here.

In a particularly beneficial method for driving a recirculation conveying means in a fuel cell system the electric drive motor can be designed for a constant or approximately constant operating point. This designing of the electric drive motor for a constant or approximately constant operating point and the variation of the drive power required for the compressor wheel by a corresponding variation of the hydrogen flow onto the turbine makes it possible to use a very simple and inexpensive electric drive motor with correspondingly simple and inexpensive electronics, since said motor, due to the constant or approximately constant operating point for which it is designed, can be realized correspondingly simply and efficiently and only a low mechanical drive power has to be provided. A large spread of speeds can be dispensed with, so that as a result of this, in addition to an improvement in the efficiency, a reduction in costs, installation space and weight can also be achieved. The electric drive motor as a result can preferably be designed as a low voltage motor.

BRIEF DESCRIPTION OF THE DRAWING FIGURES

Further advantageous configurations of the fuel cell system according to the invention and method related aspects for operating such a fuel cell system will furthermore become apparent from the example of embodiment, which will be explained in greater detail below with reference to the figures.

Therein:

DETAILED DESCRIPTION

Figure 1:
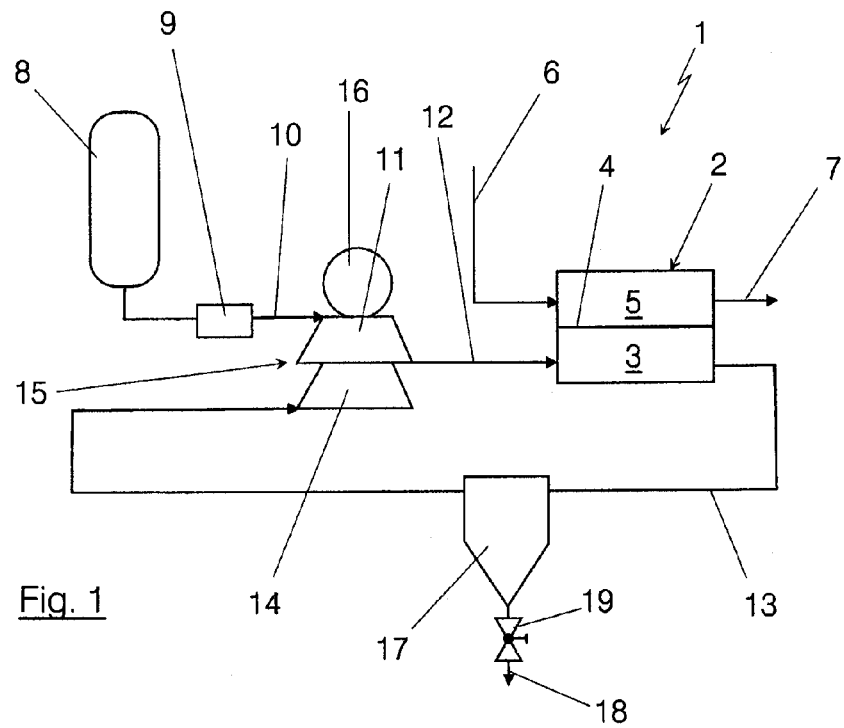
FIG. 1 shows a diagrammatic view of the section of a fuel cell system which is relevant for the invention.

In the illustration of FIG. 1, a section of a fuel cell system 1 can be recognized in very highly diagrammatic form. The system has a fuel cell 2 in the form of a PEM fuel cell. In such a PEM fuel cell, which is typically stacked as a stack consisting of a large number of individual cells, anode chambers 3 are separated from cathode chambers 5 by means of a proton conducting membrane 4. The cathode chambers or the cathode chamber 5 in this case is/are supplied with air as oxygen supplier via an incoming air line 6; unspent exhaust air passes out of the fuel cell system 1 via an exhaust air line 7. Since the region of the air supply of the cathode chamber 5 is of no further relevance for the invention presented here, it will not be discussed in greater detail. It may, however, be formed in any manner whatsoever which is known per se with corresponding conveying means, air filters, recirculation of the exhaust air, utilization of pressure energy and thermal energy in the exhaust air via a turbine or the like.

The anode chamber 3 of the fuel cell 2 is supplied with hydrogen from a hydrogen pressure reservoir 8. In this hydrogen pressure reservoir 8, the hydrogen is stored under high pressure, for example under pressures of the order of 700 bar. It then passes via a valve means 9, for example a shutoff valve and a pressure regulator, and a hydrogen feed line 10 into the region of a turbine 11, in which the hydrogen is expanded and in so doing gives off energy to the turbine 11. The hydrogen then passes into the anode chamber 3 via an anode feed line 12. The anode chamber 3 in the example of embodiment shown here is supplied with more hydrogen than can be electrochemically reacted therein. This is known from the prior art and is generally conventional. The supplying of the anode chamber 3 with more hydrogen than can be reacted therein ensures that all the regions of the anode chamber are supplied with sufficient hydrogen and the entire active surface of the membrane 4 is ideally utilized. The exhaust flowing out of the anode chamber 3 passes via a recirculation line 13 to a compressor wheel 14, and is conveyed back by the latter into the anode feed line 12 and hence into the anode chamber 3. The compressor wheel 14 in this case, just like the turbine 11, is part of a recirculation conveying means 15. The compressor wheel 14 itself in this case can be formed as any flow compressor whatsoever, preferably as a radial compressor or side channel compressor. The recirculation conveying means 15 in this case is driven via the turbine 11 and the hydrogen that is expanded therein from the hydrogen feed line 10, and can additionally receive drive power from an electric drive motor 16 if this is necessary for conveying the exhaust gas in the recirculation line 13. The drive motor 16 may be formed in any manner whatsoever, for example as a high voltage motor or as a low voltage motor. Low voltage motors with a voltage of less than 60 V in this case have the advantage that they can typically be designed more simply and inexpensively. Forming the drive motor 16 as a low voltage motor, in particular as a 12 volt or 24 volt motor, would therefore be preferable. In principle, it would of course also be conceivable, in the event of an excess of energy in the region of the turbine 11, to operate the drive motor 16 regeneratively, in order thus to generate electricity.

Furthermore, a water separator 17 is arranged in a manner known per se and in a construction known per se in the region of the recirculation line 13. The water separator 17 may in this case either be the sole water separator 17 in the region of the circulation around the anode chamber 3, or a second optional water separator may additionally be arranged (not shown here) in the region of the anode feed line 12. The water separator 17, in addition to separating off liquid water from the exhaust in the recirculation line 13, furthermore assumes the functionality of draining off gas from the region of the recirculation line 13. The construction in this case corresponds to the construction described in PCT International Publication No. WO 2008/052578 A1. In the circulation around the anode chamber 3 of the fuel cell 2 that is formed by the recirculation line 13 and the anode feed line 12, a small portion of water becomes enriched during operation, this being produced as product water partially in the anode chamber 3 of the fuel cell, even if the major part of the product water is produced in the cathode chamber 5. Furthermore, inert gases, such as for example nitrogen, with time pass through the membranes 4 from the cathode chamber 5 into the region of the anode chamber 3, and then, since they are not used up, are jointly circulated via the recirculation conveying means 15. Over a longer operating period, water and inert gas thus become enriched in the circulation around the anode chamber 3. The hydrogen concentration drops accordingly, so that the performance of the fuel cell 2 suffers. The water and the inert gas are therefore drained off from time to time. This is done such that the water separator 17 has a drain line 18 and a discharge valve 19, what is called a drain/purge valve 19. Once a sufficient amount of water has accumulated in the water separator 17, opening of the drain/purge valve 19 can take place, for example dependent on water level or in time controlled manner. The water then flows away out of the water separator 17 and then a certain proportion of the gas accumulated in the circulation around the anode chamber 3 will likewise flow away with it, so that the concentration of the hydrogen subsequently increases. The water and/or the gases that is/are removed may in this case for example be introduced into the region of the incoming air line 6, or they may also be guided out of the fuel cell system 1 and released into the environment. Since typically hydrogen is present in the gases, this should be correspondingly diluted or afterburned in order to avoid harmful emissions.

Figure 2:
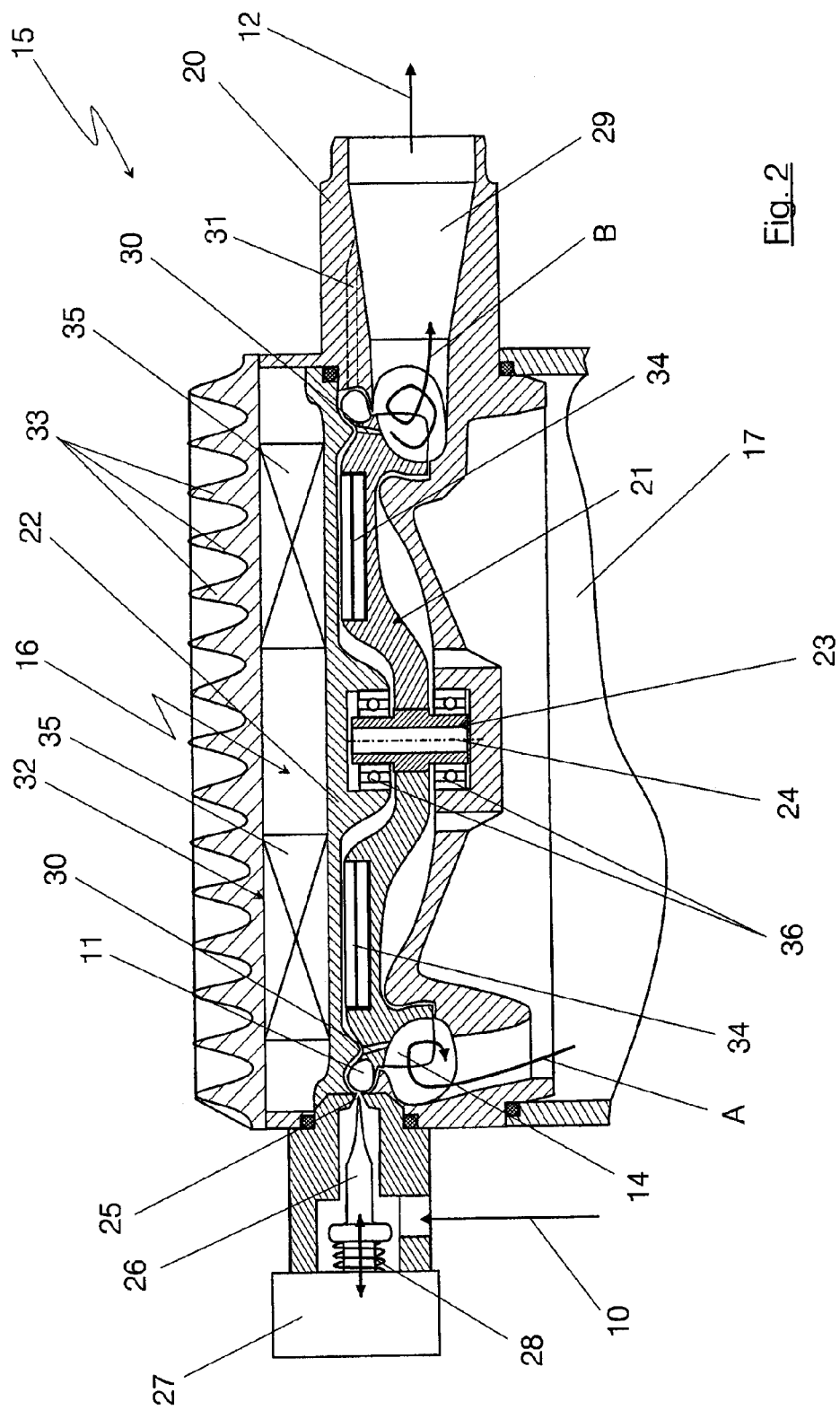
FIG. 2 shows a recirculation conveying means in one possible construction according to the invention.

In the illustration of FIG. 2, the recirculation conveying means 15 of the fuel cell system 1 is described once again with reference to an exemplified possible highly integrated construction. The recirculation conveying means 15 in this case is embodied as a cover integrated in the water separator 17. It consists substantially of a housing 20 and a rotationally movable component 21 arranged therein that has the turbine 11 and the compressor wheel 14. The turbine 11 in this case can be seen in the upper part of the component 21 illustrated in FIG. 2. It is formed by way of example as a Pelton turbine. In the illustration, two individual blades thereof can be seen. The component 21 is borne in the housing 20 or in a housing cover 22 with a bearing means 23, so that the component 21 can rotate about an axis of rotation 24. The region of the turbine 11 is approached by a stream of hydrogen from the hydrogen pressure reservoir 8, which hydrogen flows via the hydrogen feed line 10 into the region of a nozzle 25, and from there reaches the blades of the turbine 11. The nozzle 25 in this case is formed such that a nozzle needle 26, as indicated by the double arrow, can be adjusted by means of an actuator 27 such that the flow through the nozzle 25 is adjustable. This means that the supplied fresh hydrogen can be metered accordingly, and at the same time a suitable speed can be set in order for the flow to approach the blades of the turbine 11 ideally at the speed of sound of the hydrogen. The nozzle needle 26, in the embodiment shown here, is for example regulated or controlled via the actuator 27 and a restoring spring 28. In the region of the compressed gas reservoir 8 there is typically a pressure level of approximately 700 bar. After the valve means 9, there is then a pressure of the order of 8 to 15 bar that is reduced via the pressure regulator of the valve means. The hydrogen gas, which flows through the nozzle or the needle valve 25 at the speed of sound, thus undergoes a pressure drop of approx. 8 to 15 bar in the direction of flow ahead of the nozzle 25 and approx. 1 to 3 bar after the nozzle 25, upon flowing into the turbine 11. This pressure drop suffices to achieve a speed of Mach 1 in the region of the annular area between the nozzle 25 and nozzle needle 26, which forms the narrowest cross section of the hydrogen metering means.

Due to the rotation of the turbine 11, the entire component 21 is caused to rotate, so that furthermore the compressor wheel 14 rotates in addition to the turbine 11. The compressor wheel, in the example of embodiment illustrated here, is formed as a side channel compressor (momentum exchange machine), which draws in the exhaust from the anode chamber 3 substantially in the axial direction of its axis of rotation 24 out of the water separator 17, as is indicated by the arrow represented by A. The exhaust A that is drawn in in the axial direction is then conveyed accordingly in the region of the compressor wheel 14, and is set in a rotary motion before flowing away in a tangential direction, as indicated by the arrow B, into the region of a diffuser 29, which is either connected to the anode feed line 12 or forms said line itself. In addition to the compressor wheel 14 that is formed as a side channel compressor, alternative configurations, for example in the form of a radial compressor, would likewise be conceivable.

In order then to mix the fresh hydrogen admetered in the region to the turbine 11 with the exhaust A from the anode chamber 3, channels 30 are provided in the component 21. These connect the region of the turbine 11, and here in particular the region between the individual blades of the turbine 11, to the region of the compressor wheel 14. The channels 30 in this case are oriented such that the accumulating hydrogen flows through the channels from the region of the turbine 11 into the region of the compressor wheel 14. Since with this configuration as a side channel compressor a corresponding rotary motion of the exhaust A that is drawn in is produced, the orientation of the channels 30 in the example of embodiment shown here is selected such that they run slightly obliquely in the direction of the axis of rotation 24, so that the gas flowing through the channels 30 meets the gas flow of the anode exhaust gas represented by the arrows A, B in the same direction. This achieves very good mixing and uniform distribution of the fresh hydrogen and the anode exhaust gas. In this case, further energy contained in the fresh hydrogen can be utilized for uniform distribution. In the region of the diffuser 29, the flow is then calmed and slowed accordingly, so that the necessary pressure for flowing into the anode chamber is ensured.

Should the amount of hydrogen flowing through the channels 30 from the region of the turbine 11 into the region of the compressor wheel 14 not suffice to provide all the fresh hydrogen that is required for operating the fuel cell 2, a portion of the hydrogen, if required, may furthermore flow via an optional bypass in the housing 20, which is provided there with the reference numeral 31, into the region of the diffuser 30, in order thus to provide a sufficient amount of fresh hydrogen.

Driving of the recirculation conveying means 15 via the turbine 11 in this case is useful and possible over large sections of the operation. However, there are operating points, for example idling operation or similar, for which an insufficient amount of fresh hydrogen is admetered to drive the compressor wheel 14 in the component 21 via the turbine 11 (alone). For these cases, and for assisting driving in all other cases, therefore, the electric drive motor 16 is provided. The latter is formed as a pancake motor in the configuration of FIG. 2, and has a stator 32 arranged above the housing cover 22, which stator can be cooled by the surrounding atmosphere via cooling fins 33. The stator 32 in this case is embodied to be separated from the rotating component 21 due to the housing cover 22. Due to the housing cover 22, the region of the component 21 can be separated from the stator 32 and sealed off relative thereto, so that the hydrogen present in the region of the rotating component 21 cannot pass into the region of the stator 32 and out of the recirculation conveying means 15. Through the housing cover 22, which has to be permeable to magnetic lines of force without, however, generating significant hysteresis losses, a magnetic coupling to permanent magnets 34 that are arranged in the region of the component 21 takes place. These permanent magnets 34 cooperate with windings 35 of the stator 32 so that the component 21 directly forms a rotor of the pancake motor 16 and can be driven accordingly.

The rotor in the form of the component 21 in this case has hydrogen constantly flowing around it and is thereby ideally cooled. Something comparable applies to the deep groove ball bearings 36 used in the bearing means 23 in the example of embodiment illustrated here, via which bearings the component 21 is borne in the illustration of FIG. 2. Due to the integration of the bearing means 23 and of the component 21 as a rotor of the pancake motor 16 in the hydrogen atmosphere, the use of hydrogen as cooling gas results in the possibility of ideal cooling, without it being necessary to guide liquid cooling medium or the like through into the region of the hydrogen atmosphere and back out again. This means that sealing problems can be largely avoided.

The bearing means illustrated here with the two deep groove ball bearings 36 in this case is efficient and effective, but relatively cost intensive due to the use of deep groove ball bearings. Instead of the deep groove ball bearings 36, other bearing concepts could also be realized, in particular a gas bearing means with hydrogen as bearing gas both for the axial bearing means and for the radial bearing means.

Figure 3:
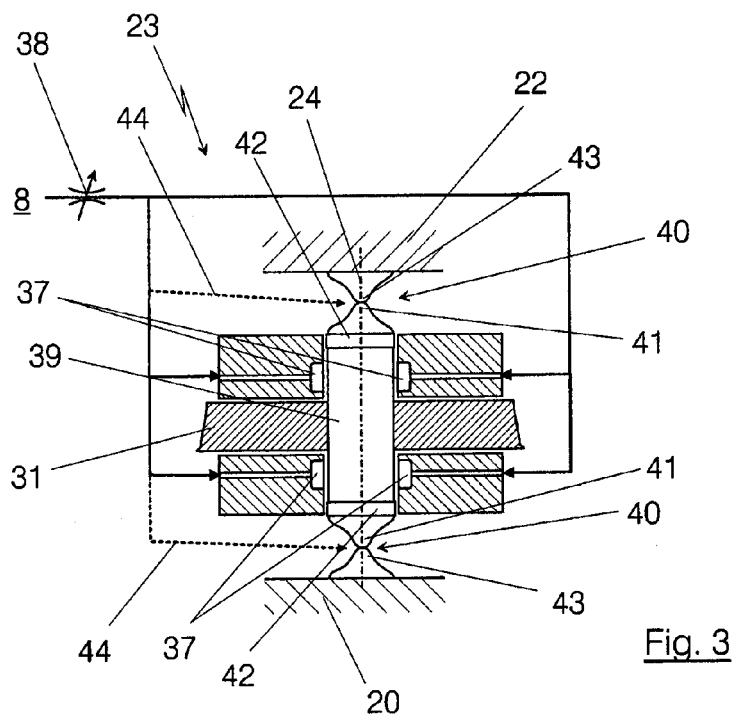
FIG. 3 shows a possible configuration of a bearing in the recirculation conveying means.

FIG. 3 illustrates a possible alternative construction of the bearing means 23, in which the radial bearing means occurs by means of hydrogen bearings. In suitable recesses or pockets 37, hydrogen from the region of the compressed gas reservoir 8 is passed via a choke 38 in order thus to bring about a gas bearing means with hydrogen for the radial bearing means of a shaft 39 of the component 21. As already mentioned, such a gas bearing means could also be provided for the axial bearing means. As an alternative to this, it is also possible to use the variant illustrated in FIG. 3 for one or, as illustrated here, both axial bearings. The axial bearings 40 in this case are formed substantially with bearing tips 41 that are fastened, for example, via elastic elements 42 in the region of the shaft 39 of the component 21. The bearing tips 41 can then, for example, run in corresponding bearing shells, or, as illustrated here, in corresponding bearing tips 43 that are connected to the housing 20 or the housing cover 22. FIG. 3 illustrates a construction in which the bearing tips 41, 43 are formed in each case as spherical elements that run on one another. This produces a sliding bearing means with minimal surface contact. In the region of the greatest Hertzian stress, with these bearings heat is also correspondingly produced, so that they can optionally be cooled by hydrogen from the supply means 44 which are shown in broken lines.

The bearing tips 41 in this case in the ideal configuration are formed of as hard as possible a material, for example of spheres of industrial ceramic or similar. In particular, the construction in this case can be selected such that the bearing tips 41 in the region of the shaft 39 of the component 21 are formed from a harder or softer material than the bearing tips 43 in the region of the housing 20 or the housing cover 22. By way of example, the bearing tips 41 in the region of the component 21 may be formed of hardened steel and the bearing tips 43 in the region of the housing 20 or the housing cover 22 may be formed of ceramic. With this configuration, the bearing tip 43 of hardened steel will wear faster than the bearing tip 41 of ceramic, which undergoes practically no wear. When servicing the recirculation conveying means 15, in this case replacement of the bearing tips 41 made of hardened steel could take place, in order thus to ensure as easy as possible a rotation of the bearing over a long life of the bearing means 23. The construction illustrated in FIG. 3 in this case, compared with the deep groove ball bearings 36 as are illustrated in FIG. 2, has the crucial advantage that it is simpler and more inexpensive to realize, and that the bearing friction becomes minimal.

The construction of the recirculation conveying means 15 according to the example of embodiment illustrated here can be constructed very inexpensively, simply and extraordinarily compactly, and for example, as illustrated in FIG. 2, be integrated in a water separator 17. This produces a very compact and space-saving construction which, due to the ideal uniform distribution of the gases, furthermore makes a very short anode feed line 12 possible. Due to the fact that a large part of the drive energy is obtained from the pressure energy of the hydrogen stored in the compressed gas reservoir 8 via the turbine 11, the pancake motor 16 has to intervene or assist the rotation of the component 21 only in certain circumstances. It can therefore be designed to be correspondingly small and efficient, which results in a smaller required installation space and also in simpler and more inexpensive component parts for the pancake motor 16. Furthermore, it is possible to design the pancake motor 16 merely for a single operating point that is constant or approximately constant. Thus, once again a considerable saving is obtained with regard to the engine electronics and the control electronics as well. Due to the fact that a major portion of the energy can be applied via the turbine 11 during regular operation, it is sufficient if the pancake motor 16 is designed, for example, for operation during idling. Dynamic peaks and the like can be provided via the hydrogen from the compressed gas reservoir 8, which in these situations is typically required anyway, since the fuel cell 2 itself then likewise requires more hydrogen in order to meet dynamic requirements.

Since the pancake motor 16 can accordingly be designed simply, it is now possible to construct it as a low voltage motor, in particular as a 12 volt motor. Such a 12 volt motor in this case is particularly small and can accordingly be realized inexpensively. The construction thus once again permits considerable savings in costs.

The construction of the fuel cell system 1 in this case, as has already been described several times, is extraordinarily compact, inexpensive and lightweight, and ensures very good efficiency of the fuel cell system 1. Its preferred application is in the field of motor vehicles, and here in particular for driving passenger cars, since here cost optimized systems with minimal installation space and maximum efficiency can display their particular advantages, in particular if dynamic or highly dynamic operation of the fuel cell system 1 is required.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A fuel cell system, comprising:
   at least one fuel cell, which includes an anode chamber and a cathode chamber;
   a hydrogen pressure reservoir;
   a recirculation line that connects an outlet of the anode chamber to an inlet of the anode chamber;
   a recirculation conveyor with a compressor wheel in a region of the recirculation line and a turbine configured to expand hydrogen under pressure before entry into the anode chamber, the recirculation conveyor is configured to be at least partially driven by the turbine,
   wherein the turbine and the compressor wheel are integrally formed on a single rotor.

2. The fuel cell system as claimed in claim 1, wherein the hydrogen flows onto the turbine via a nozzle having a nozzle needle, the throughflow of hydrogen being adjustable by a relative movement of the nozzle relative to the nozzle needle.

3. The fuel cell system as claimed in claim 1, wherein the turbine is a Pelton turbine.

4. The fuel cell system as claimed in claim 1, wherein the compressor wheel is a fluid-flow machine.

5. The fuel cell system as claimed in claim 1, wherein the compressor wheel is a side channel compressor.

6. The fuel cell system as claimed in claim 1, wherein the compressor wheel is a radial compressor.

7. A fuel cell system, comprising:
   at least one fuel cell, which includes an anode chamber and a cathode chamber;
   a hydrogen pressure reservoir;
   a recirculation line that connects an outlet of the anode chamber to an inlet of the anode chamber;
   a recirculation conveyor with a compressor wheel in a region of the recirculation line and a turbine configured to expand hydrogen under pressure before entry into the anode chamber, the recirculation conveyor is configured to be at least partially driven by the turbine,
   wherein the turbine and the compressor wheel are a single component within a common housing,
   wherein the single component has channels connecting a region of the turbine and a region of the compressor wheel together, wherein the channels are located entirely within the common housing.

8. The fuel cell system as claimed in claim 7, wherein the channels are formed, starting from the region of the turbine, such that hydrogen flowing through the channels flows into the region of the compressor wheel in a same direction as a flow of the exhaust gas in the compressor wheel.

9. The fuel cell system as claimed in claim 1, wherein the single component is configured to be driven by a pancake electric drive motor.

10. A fuel cell system, comprising:
    at least one fuel cell, which includes an anode chamber and a cathode chamber;
    a hydrogen pressure reservoir;

a recirculation line that connects an outlet of the anode chamber to an inlet of the anode chamber;

a recirculation conveyor with a compressor wheel in a region of the recirculation line and a turbine configured to expand hydrogen under pressure before entry into the anode chamber, the recirculation conveyor is configured to be at least partially driven by the turbine, wherein the turbine and the compressor wheel are a single component, wherein the single component is configured to be driven by a pancake electric drive motor, wherein a stator of the pancake electric motor is arranged above the single component, and the single component includes magnetic elements forming a rotor of the electric pancake motor.

11. The fuel cell system as claimed in claim 10, wherein the rotor is arranged in a space that is sealed off relative to the stator.

12. The fuel cell system as claimed in claim 11, wherein the space is an interior of a water separator in the recirculation line.

13. The fuel cell system as claimed in claim 12, wherein the circulation conveyor forms a hydrogen-tight cover of the water separator.

14. The fuel cell system as claimed in claim 9, wherein the pancake electric drive motor is a low voltage motor.

15. The fuel cell system as claimed in claim 1, wherein at least one axial bearing of the single component is formed by a bearing tip.

16. The fuel cell system as claimed in claim 15, wherein the bearing tip is formed as a spherical surface that runs on a spherical counter surface.

17. The fuel cell system as claimed in claim 16, wherein the bearing tip is pre-stressed relative to the spherical counter surface by means of an axially acting spring element.

18. The fuel cell system as claimed in claim 1, wherein the single rotor includes integral channels connecting a region of the turbine with a region of the compressor wheel.

19. A fuel cell system, comprising:
at least one fuel cell, which includes an anode chamber and a cathode chamber;
a hydrogen pressure reservoir;
a recirculation line that connects an outlet of the anode chamber to an inlet of the anode chamber;
a recirculation conveyor coupled to the hydrogen pressure reservoir and the recirculation line, wherein the recirculation conveyor includes a single rotor that is a turbine, compressor wheel, and a part of a motor.

20. The fuel cell system as claimed in claim 19, wherein the single rotor includes magnets and a remainder of the motor includes a stator fluidly isolated from the part of the motor formed by the single rotor.

* * * * *